United States Patent
Kilchyk et al.

(10) Patent No.: US 12,326,162 B2
(45) Date of Patent: Jun. 10, 2025

(54) INTEGRATED RADIAL DIFFUSER WITH MOVABLE DIFFUSER HUB

(71) Applicant: Hamilton Sundstrand Corporation, Charlotte, NC (US)

(72) Inventors: Viktor Kilchyk, Lancaster, NY (US); Jeffrey S. Dearborn, Windsor Locks, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 392 days.

(21) Appl. No.: 17/832,137

(22) Filed: Jun. 3, 2022

(65) Prior Publication Data

US 2023/0392621 A1    Dec. 7, 2023

(51) Int. Cl.
| | |
|---|---|
| *F15D 1/02* | (2006.01) |
| *B33Y 80/00* | (2015.01) |
| *F25B 9/00* | (2006.01) |
| *F25B 9/06* | (2006.01) |

(52) U.S. Cl.
CPC .............. *F15D 1/025* (2013.01); *B33Y 80/00* (2014.12); *F25B 9/004* (2013.01); *F25B 9/06* (2013.01)

(58) Field of Classification Search
CPC ......... F15D 1/025; B33Y 80/00; F25B 9/004; F25B 9/06; F28F 13/08; F28F 2009/029; F28F 9/0263; F28F 9/02; F28F 2250/08; F04D 29/442; B01J 8/18; F28D 7/16; F02K 3/06

See application file for complete search history.

(56) References Cited

U.S. PATENT DOCUMENTS

| | | | |
|---|---|---|---|
| 3,868,196 A | 2/1975 | Lown | |
| 6,712,588 B1 | 3/2004 | Ribaud | |
| 6,887,954 B2 | 5/2005 | Maurel | |
| 7,779,644 B2 | 8/2010 | Decrisantis et al. | |
| 10,110,156 B2 | 10/2018 | Koenig et al. | |
| 11,047,237 B2 | 6/2021 | Bruno et al. | |
| 2002/0048537 A1* | 4/2002 | Maurel | B01J 8/1809 422/139 |

(Continued)

FOREIGN PATENT DOCUMENTS

| | | | |
|---|---|---|---|
| EP | 3537089 A1 | 9/2019 | |
| WO | WO-2010143704 A1 * | 12/2010 | ............ F25B 39/028 |

OTHER PUBLICATIONS

English translation of WO-2010143704-A1, dated Nov. 14, 2024 (Year: 2024).*

(Continued)

*Primary Examiner* — Edelmira Bosques
*Assistant Examiner* — Brett Peterson Mallon
(74) *Attorney, Agent, or Firm* — Kinney & Lange, P.A.

(57) ABSTRACT

A radial diffuser includes an inlet section, outlet section, diffuser wall, and movable diffuser hub. The inlet section has a cylindrical shape and a circular cross section. The diffuser wall includes an inner surface defining a fluid flow path which is non-linear, and includes a convex curved section and a concave curved section. The convex curved section is adjacent to the inlet section and has a convex curvature. The concave curved section is adjacent to the outlet section and has a concave curvature. The movable diffuser hub is configured to move with respect to a central flow axis relative to the diffuser wall and can thereby alter a fluid flow through the radial diffuser.

20 Claims, 10 Drawing Sheets

(56) References Cited

U.S. PATENT DOCUMENTS

| | | | |
|---|---|---|---|
| 2007/0062679 A1* | 3/2007 | Agee | F28F 9/02 |
| | | | 165/158 |
| 2012/0114463 A1 | 5/2012 | Beers et al. | |
| 2014/0255204 A1* | 9/2014 | Totten | F01D 5/066 |
| | | | 156/60 |
| 2016/0108814 A1* | 4/2016 | Schmitz | B23P 15/26 |
| | | | 60/39.511 |
| 2019/0204010 A1 | 7/2019 | Breeze-Stringfellow et al. | |
| 2019/0353424 A1* | 11/2019 | Vouche | F28F 13/08 |

OTHER PUBLICATIONS

O'Neill, Kim. "Determining Factors in Choosing Pneumatic vs. Electric Actuators", Oct. 11, 2012. Assured Automation. (https://assuredautomation.com/news-and-training/determining-factors-in-choosing-pneumatic-vs-electric-actuators/) (Year: 2024).*

Extended European Search Report for EP Application No. 23172434.5, dated Oct. 12, 2023, 5 pages.

* cited by examiner

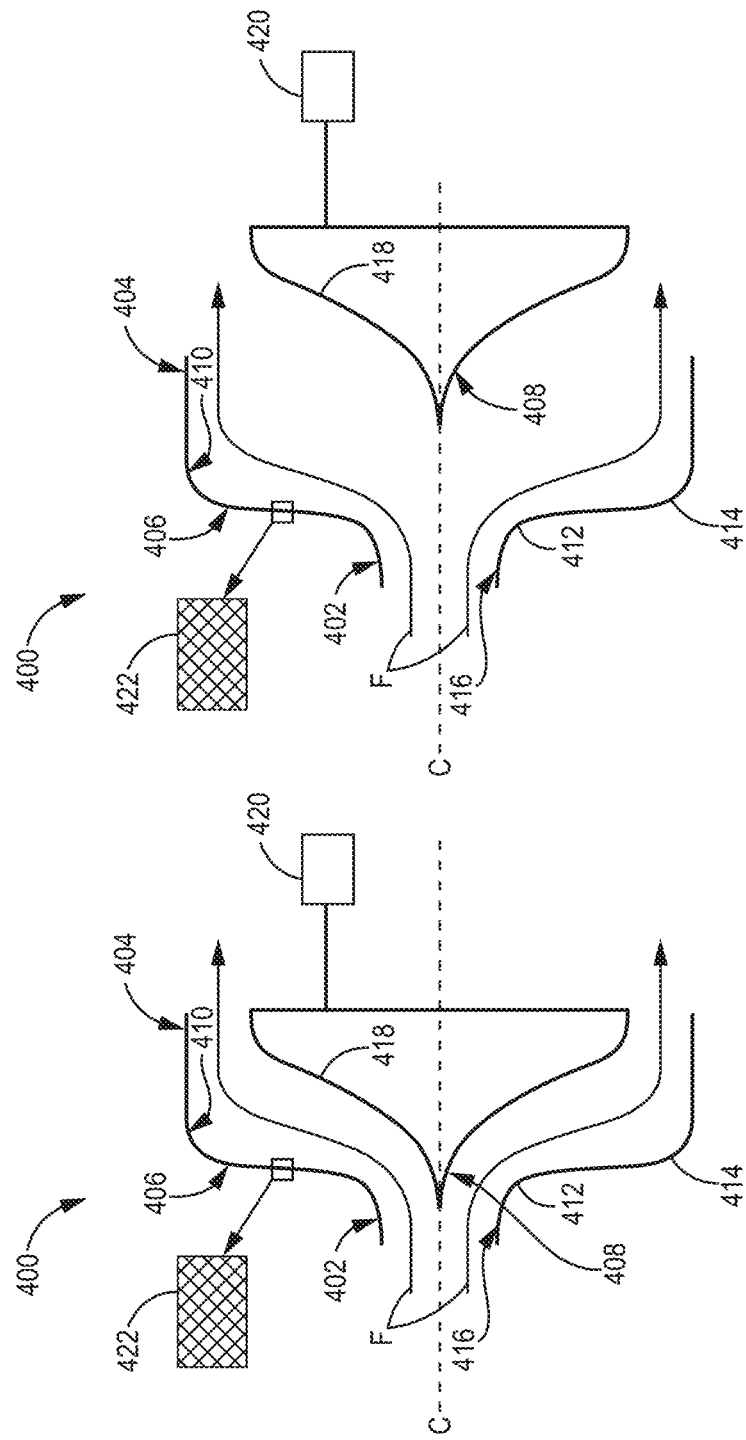

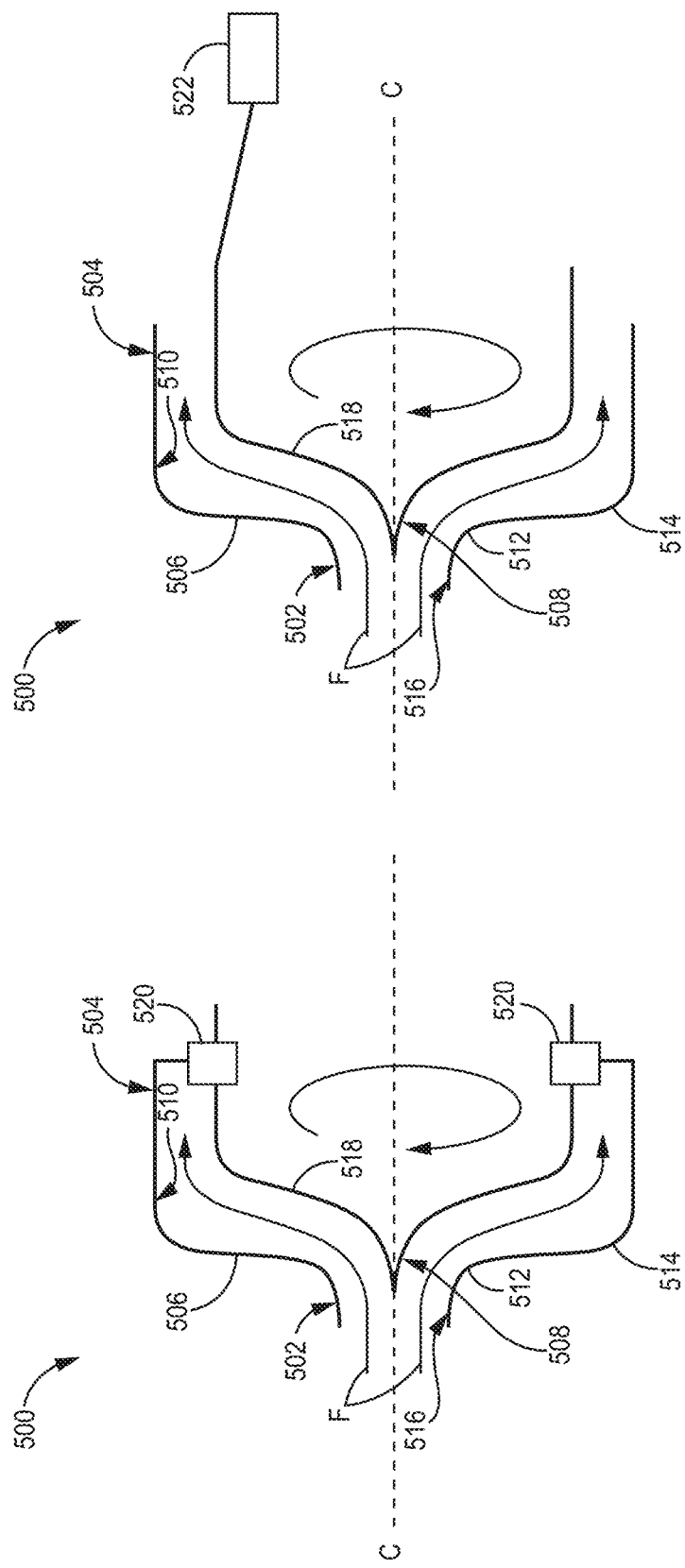

INTEGRATED RADIAL DIFFUSER WITH MOVABLE DIFFUSER HUB

BACKGROUND

The present disclosure relates generally to diffusers and in particular to radial diffusers for an aircraft.

It is desirable to incorporate radial diffusers where possible to save on space, weight, and materials costs. However, conventional diffusers are not able to respond to or control the flow rate of the working fluid passing through the diffuser.

SUMMARY

According to one aspect of the present invention, a radial diffuser for a heat exchanger system includes a diffuser inlet section, a diffuser outlet section, a diffuser wall, and a movable diffuser hub. The diffuser inlet section is upstream of the heat exchanger system and oriented along a central flow axis of the radial diffuser. The diffuser inlet section has a cylindrical shape which extends along the central flow axis and a circular cross section along an inlet section plane perpendicular to the central flow axis. The diffuser outlet section is downstream of the diffuser inlet section with respect to the central flow axis. The diffuser wall includes a diffuser wall inner surface defining a fluid flow path which is non-linear. The diffuser wall inner surface includes a convex curved section and a concave curved section. The convex curved section is adjacent to the diffuser inlet section and has a convex curvature with respect to the central flow axis. The concave curved section is adjacent to the diffuser outlet section and has a concave curvature with respect to the central flow axis. The concave curved section is adjacent to and downstream of the convex curved section with respect to the central flow axis. The movable diffuser hub is configured to move with respect to the central flow axis relative to the diffuser wall and can thereby alter a fluid flow through the radial diffuser.

According to another aspect of the present invention, an air cycle machine includes a turbine oriented along a central flow axis, a heat exchanger downstream of the turbine with respect to the central flow axis, and a radial diffuser. The turbine includes a turbine outlet. The radial diffuser includes a diffuser inlet section, a diffuser outlet section, a diffuser wall, and a movable diffuser hub. The diffuser inlet section is upstream of the heat exchanger system and oriented along a central flow axis of the radial diffuser. The diffuser inlet section has a cylindrical shape which extends along the central flow axis and a circular cross section along an inlet section plane perpendicular to the central flow axis. The diffuser outlet section is downstream of the diffuser inlet section with respect to the central flow axis. The diffuser wall includes a diffuser wall inner surface defining a fluid flow path which is non-linear. The diffuser wall inner surface includes a convex curved section and a concave curved section. The convex curved section is adjacent to the diffuser inlet section and has a convex curvature with respect to the central flow axis. The concave curved section is adjacent to the diffuser outlet section and has a concave curvature with respect to the central flow axis. The concave curved section is adjacent to and downstream of the convex curved section with respect to the central flow axis. The movable diffuser hub is configured to move with respect to the central flow axis relative to the diffuser wall and can thereby alter a fluid flow through the radial diffuser. The radial diffuser is downstream of the turbine and upstream of the heat exchanger with respect to the central flow axis. The radial diffuser is configured to receive a fluid flow from the turbine through the turbine outlet, diffuse the fluid flow, and direct the fluid flow into the heat exchanger.

According to yet another aspect of the present invention, a method of manufacturing a radial diffuser includes manufacturing a diffuser inlet section of the radial diffuser. A diffuser wall of the radial diffuser is manufactured adjacent to the diffuser inlet section. A diffuser outlet section of the radial diffuser is manufactured adjacent to the diffuser wall. A movable diffuser hub of the radial diffuser is manufactured such that the movable diffuser hub is configured to move relative to the diffuser wall during operation of the radial diffuser.

BRIEF DESCRIPTION OF THE DRAWINGS

The subject matter, which is regarded as the disclosure, is particularly pointed out and distinctly claimed in the claims at the conclusion of the specification. The following descriptions of the drawings should not be considered limiting in any way.

FIG. 7A is a schematic depiction of a radial diffuser having an actuated diffuser hub in an initial state.

FIG. 7B is a schematic depiction of the radial diffuser of FIG. 7A, with the actuated diffuser hub in an extended state.

FIGS. 8A-8B are schematic depictions of a radial diffuser having a rotatable diffuser hub.

DETAILED DESCRIPTION

Radial diffusers perform approximately as well as conical diffusers with respect to pressure drop and flow distribution, while using less material and taking up less space than a conventional conical diffuser. The efficiency and advantages of a radial diffuser can be further improved by allowing the diffuser hub to move axially or rotationally, as well as by additively manufacturing the radial diffuser. Axial movement of the diffuser hub varies the ratio of the diffuser outlet area to the diffuser inlet area, which can allow for more efficient diffusion of air (or another working fluid) and can help to achieve reduced losses. Additionally, axial movement of the diffuser hub can further increase the pressure ratio of the radial diffuser while avoiding or reducing shock experienced by the fluid flow.

Figure 1:
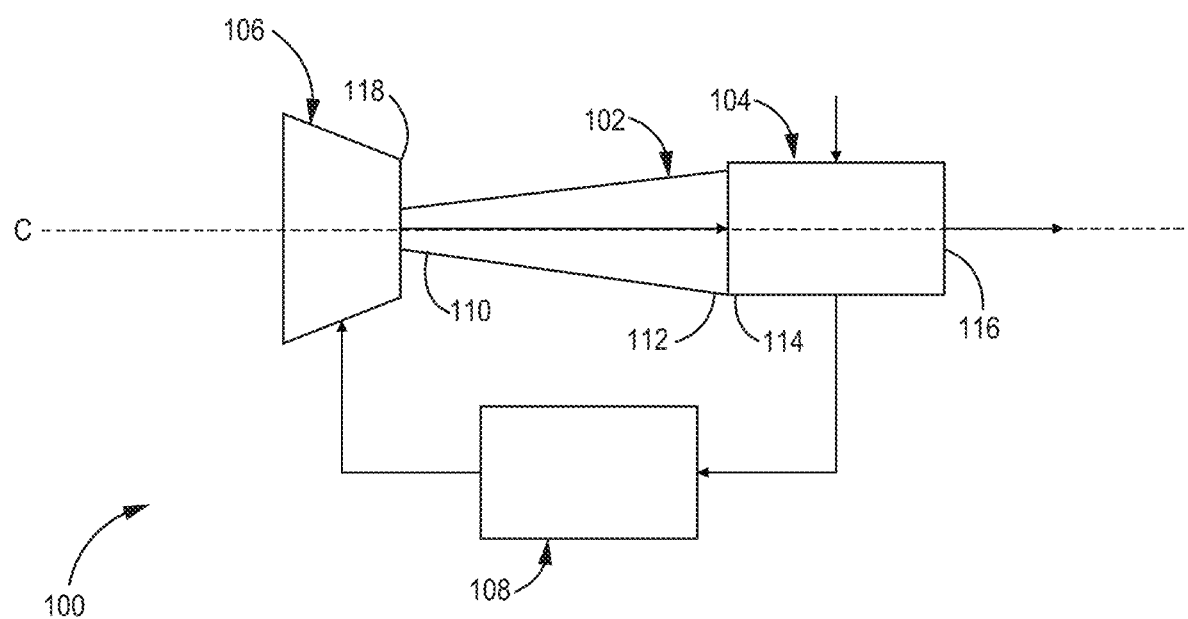
FIG. 1 is a schematic depiction of an air cycle machine including a diffuser and a heat exchanger.

FIG. 1 is a schematic depiction of air cycle machine 100. Air cycle machine 100 includes diffuser 102, heat exchanger 104, turbine 106, and load 108. Diffuser 102 includes diffuser inlet section 110 and diffuser outlet section 112. Heat exchanger 104 includes heat exchanger inlet section 114 and heat exchanger outlet section 116. Turbine 106 includes turbine outlet 118.

Air cycle machine 100 can be part of an environmental control system within an aircraft. Diffuser 102 can be a conventional conical diffuser, such as conical diffuser 202 (described below in reference to FIGS. 2-3B), or a radial diffuser, such as radial diffuser 302 (described below in reference to FIGS. 4-5B). Heat exchanger 104 can be a plate heat exchanger or other suitable heat exchanger. In the example depicted in FIG. 1, heat exchanger 104 is a cross-flow heat exchanger. Load 108 can be a section or component of the aircraft requiring cooling.

Turbine 106, diffuser 102, and heat exchanger 104 are oriented along central flow axis C-C. Turbine 106 is located upstream of diffuser 102 and heat exchanger 104 with respect to central flow axis C-C. Turbine outlet 118 is adjacent to diffuser inlet section 110. Diffuser 102 is located downstream of turbine 106 and upstream of heat exchanger 104. Diffuser outlet section 112 is adjacent to heat exchanger inlet section 114. Diffuser 102 has a larger cross-sectional area at diffuser outlet section 112 than at diffuser inlet section 110.

During operation of air cycle machine 100, a flow of a working fluid passes through turbine 106, diffuser 102, and heat exchanger 104 along central flow axis C-C. This working fluid can be air or another fluid. Working fluid leaves turbine 106 at turbine outlet 118 and flows into diffuser inlet section 110. Diffuser 102 diffuses the working fluid received from turbine 106, decreasing its velocity as it travels along the length of diffuser 102. Diffuser outlet section 112 directs the working fluid out of diffuser 102 and into heat exchanger 104. Heat exchanger 104 transfers heat between the working fluid from diffuser 102 and a second fluid. The working fluid then exits heat exchanger 104 at heat exchanger outlet 116. The working fluid and the second fluid can be exhausted to ambient, to another section of the aircraft or can enter load 108 to heat or cool a component of the aircraft.

Figure 2:
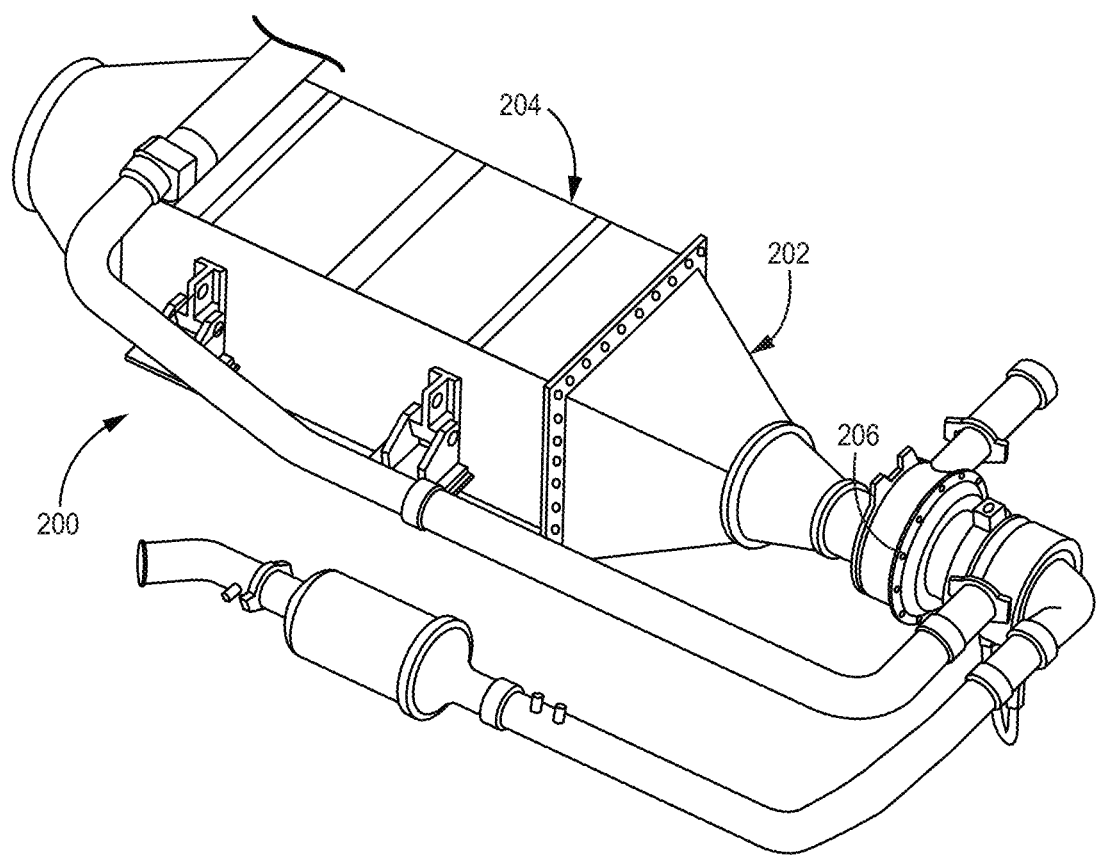
FIG. 2 is a perspective view of a heat exchanger system which includes a conical diffuser.

FIG. 2 is a perspective view of heat exchanger system 200. Heat exchanger system 200 includes conical diffuser 202, heat exchanger 204, and turbine outlet 206. Conical diffuser 202 includes diffuser inlet section 208, diffuser outlet section 210, diffuser wall 212, and diffuser hub 214 (all shown in FIGS. 3A-3B).

Heat exchanger 204 and turbine outlet 206 can operate in substantially the same way as heat exchanger 104 and turbine outlet 118 (described above in reference to FIG. 1). As described in more detail below, conical diffuser 202 directs a working fluid flow along the length of conical diffuser 202. As the cross-sectional area of conical diffuser 202 increases, the velocity of the fluid flow through conical diffuser 202 decreases.

Figure 3B:
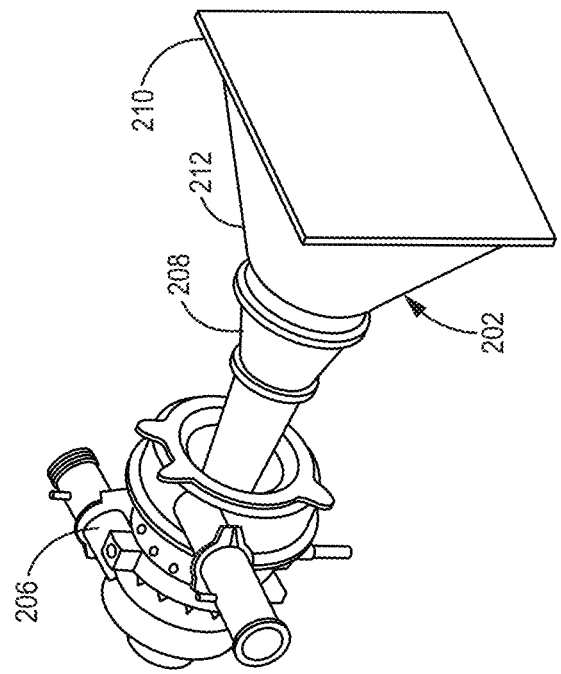
FIG. 3B is a perspective view of the conical diffuser of FIG. 3A.
Figure 3A:
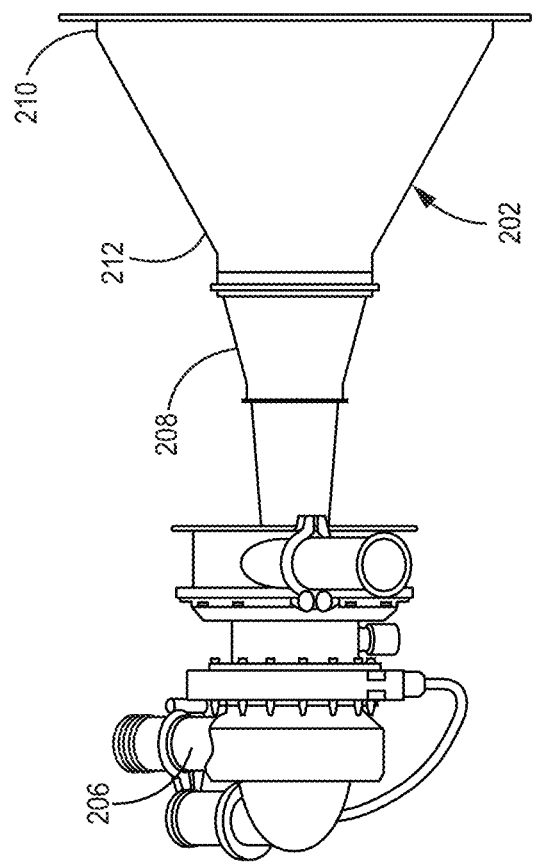
FIG. 3A is a side view of a conical diffuser.

FIG. 3A is a side view of conical diffuser 202. FIG. 3B is a perspective view of conical diffuser 202. FIGS. 3A-3B will be discussed concurrently. Conical diffuser 202 includes diffuser inlet section 208, diffuser outlet section 210, and diffuser wall 212.

The velocity of fluid flow through conical diffuser 202 is highest at diffuser inlet section 208. As the cross-sectional area of conical diffuser 202 increases, the velocity of the fluid flow along central flow axis C-C decreases. In this way, the passage of working fluid through a diffuser, such as conical diffuser 202, converts a portion of the working fluid's kinetic energy into potential energy. This conversion causes the working fluid to increase in pressure as it travels along the length of conical diffuser 202.

Figure 4:
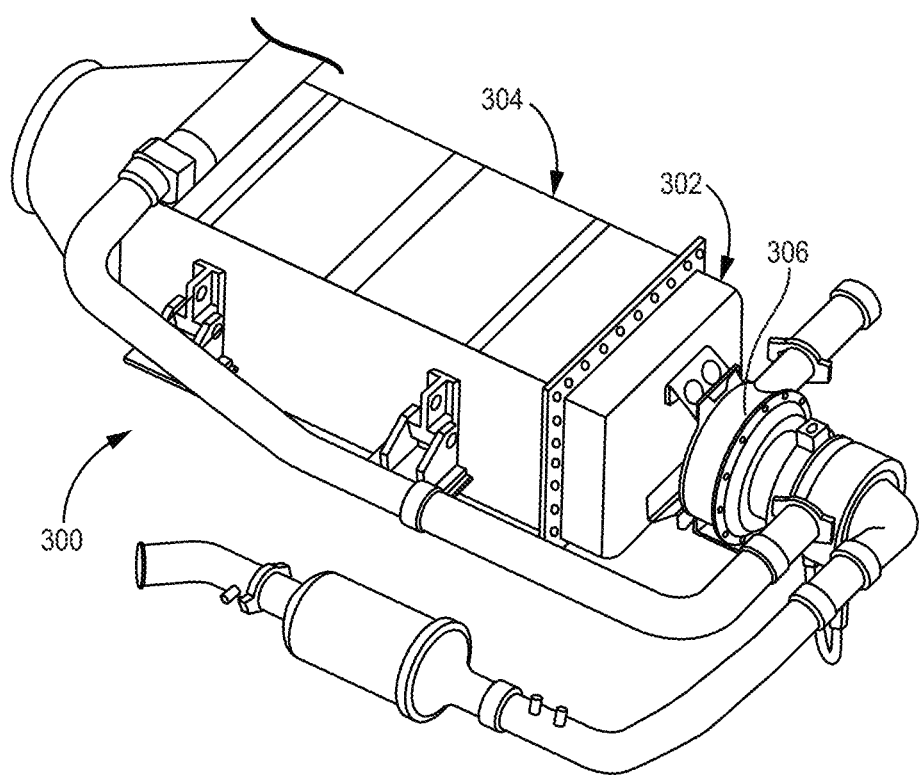
FIG. 4 is a perspective view of a heat exchanger system which includes a radial diffuser.

FIG. 4 is a perspective view of heat exchanger system 300. Heat exchanger system 300 includes radial diffuser 302, heat exchanger 304, and turbine outlet 306. Radial diffuser 302 includes diffuser inlet section 308, diffuser outlet section 310, diffuser wall 312, and diffuser hub 314 (all shown in FIGS. 5A-5B). Heat exchanger system 300 can operate in substantially the same way as heat exchanger system 200 (described above in reference to FIG. 2).

Figures 5A, 5B:
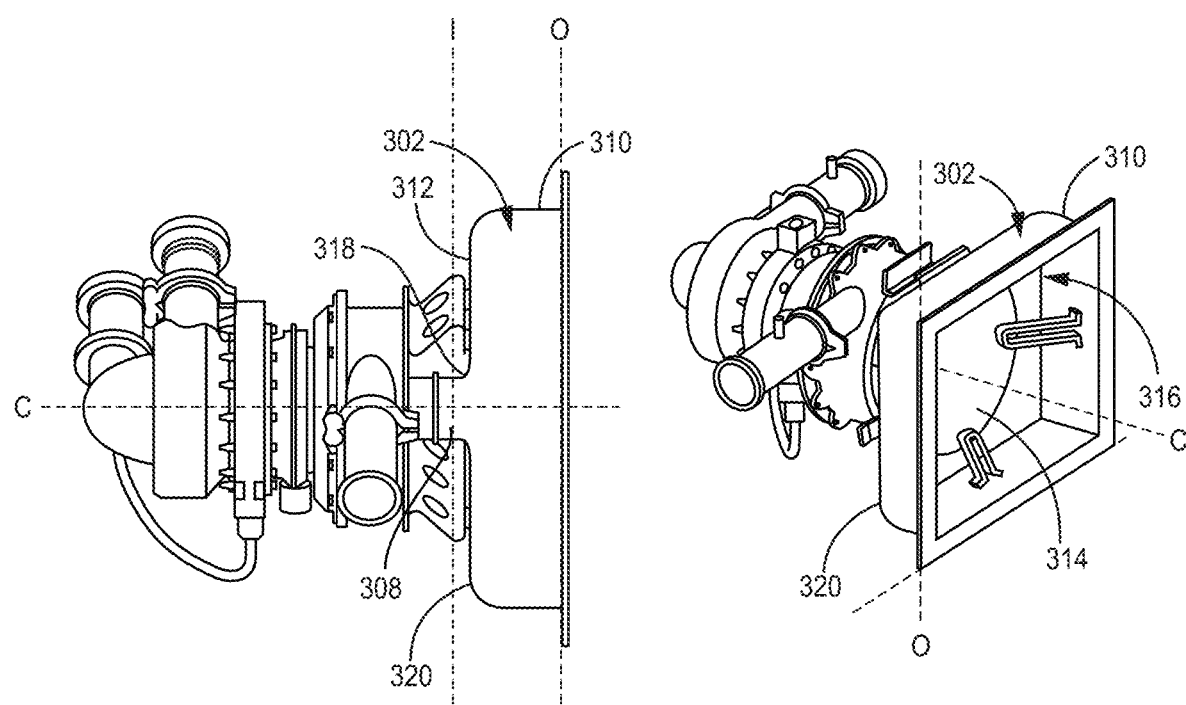
FIG. 5A is a side view of a radial diffuser.
FIG. 5B is a perspective view of the radial diffuser of FIG. 5A.

FIG. 5A is a side view of radial diffuser 302. FIG. 5B is a perspective view of radial diffuser 302. FIGS. 5A-5B will be discussed concurrently. Radial diffuser 302 includes diffuser inlet section 308, diffuser outlet section 310, diffuser wall 312, and diffuser hub 314. Diffuser wall 312 includes diffuser wall inner surface 316 which defines a fluid flow path and which includes convex curved section 318 and concave curved section 320.

Diffuser inlet section 308 extends along central flow axis C-C. Diffuser inlet section 308 can be approximately cylindrical in shape and can have an approximately circular cross section along inlet section plane I perpendicular to central flow axis C-C. Diffuser outlet section 310 is downstream of diffuser inlet section 308 with respect to central flow axis C-C. In the example shown in FIGS. 5A-5B, diffuser outlet section 310 has an approximately rectangular prism shape and an approximately square cross section along outlet section plane O perpendicular to central flow axis C-C. Diffuser outlet section 310 can have an approximately circular cross section along outlet section plane O, or can have another suitable cross sectional shape. Diffuser wall 312 is downstream of diffuser inlet section 308 and upstream of diffuser outlet section 310 such that diffuser wall 312 is between diffuser inlet section 308 and diffuser outlet section 310 with respect to central flow axis C-C. Convex curved section 318 is adjacent to and downstream of diffuser inlet section 308 such that convex curved section 318 is an upstream end of diffuser wall 312. Convex curved section 318 has a convex curvature with respect to central flow axis C-C and curves away from central flow axis C-C. Concave curved section 320 is downstream of convex curved section 318, and is adjacent to and upstream of diffuser outlet section 310 such that concave curved section 320 is a downstream end of diffuser wall 312. Concave curved section 320 has a concave curvature with respect to central flow axis C-C and curves towards central flow axis C-C. The fluid flow path is defined by diffuser wall inner surface 316 and is non-linear. In this way, radial diffuser 302 diffuses working fluid along a non-linear path.

Radial diffuser 302 can operate in substantially the same way as conical diffuser 202 (described above in reference to FIGS. 2-3B) in that radial diffuser 302 diffuses a working fluid flow by decreasing its velocity and, ideally, maintaining laminar flow. The working fluid flow enters radial diffuser 302 at diffuser inlet section 308. The working fluid then flows along the fluid flow path around diffuser hub 314. The diffused working fluid then exits radial diffuser 302 at diffuser outlet section 310. The use of convex curved section 318 and concave curved section 320 help to avoid pressure losses of the flow of working flow through radial diffuser 302. Additionally, radial diffuser 302 can be approximately nine inches shorter than a conical diffuser with a comparable diffusion rate.

Figure 6A:
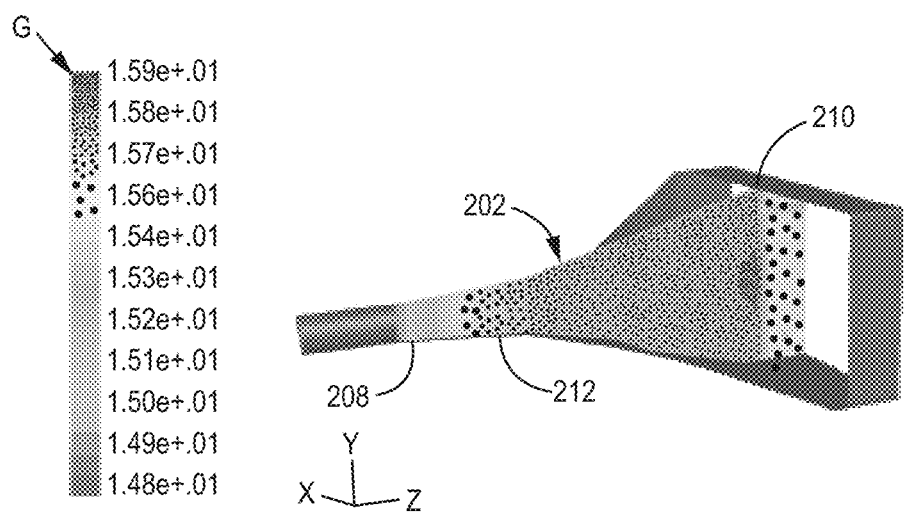
FIG. 6A depicts the change in pressure along the length of a conical diffuser.

FIG. 6A depicts the change in pressure along the length of conical diffuser 202 (described above in reference to FIGS.

2-3B). Gradient G depicts the static pressure of working fluid within conical diffuser 202 in pounds per square inch (psi).

The static pressure of working fluid within conical diffuser 202 is lowest at diffuser inlet section 208. The static pressure gradually increases along diffuser wall 212 and is fairly constant along diffuser outlet section 210. As described above in reference to FIGS. 3A-3B, this increase in static pressure is accompanied by a drop in the velocity of the working fluid flow. A uniform and slower-moving working fluid flow is desirable to increase the efficiency of a heat exchanger.

Figure 6B:
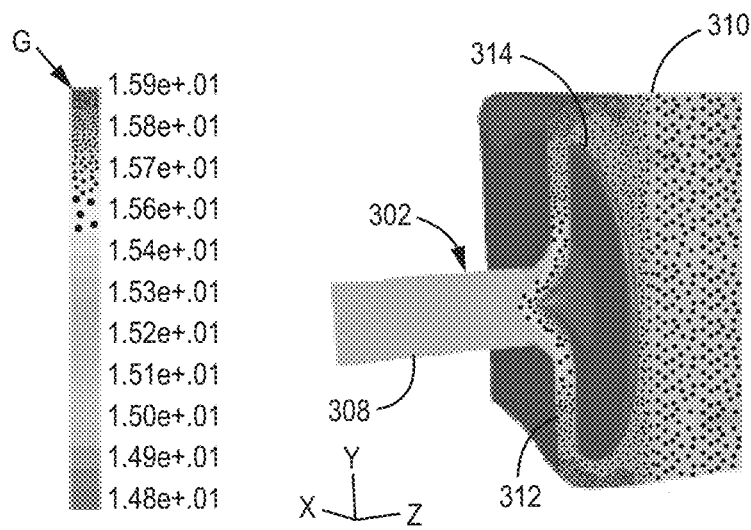
FIG. 6B depicts the change in pressure along the length of a radial diffuser.

FIG. 6B depicts the change in pressure along the length of radial diffuser 302 (described above in reference to FIGS. 4-5B). Gradient G depicts the static pressure of working fluid within radial diffuser 302 in pounds per square inch (psi).

The change in static pressure along the length of radial diffuser 302 is substantially the same as the change in static pressure along the length of conical diffuser 202 shown in FIG. 6A. The static pressure of the working fluid within radial diffuser 302 is lowest at diffuser inlet section 308, gradually increases as the working fluid flows between diffuser wall 312 and diffuser hub 314, and is fairly constant along diffuser outlet section 310. In this way, radial diffuser 302 achieves a substantially similar outcome as conical diffuser 202 across a shorter length.

FIG. 7A is a schematic depiction of radial diffuser 400 having an actuated diffuser hub in an initial state. FIG. 7B is a schematic depiction of radial diffuser 400, with the actuated diffuser hub in an extended state. FIGS. 7A-7B will be discussed in turn below. Radial diffuser 400 includes diffuser inlet section 402, diffuser outlet section 404, diffuser wall 406, and actuated diffuser hub 408. Diffuser wall 406 includes diffuser wall inner surface 410 which defines fluid flow path F and which includes convex curved section 412 and concave curved section 414. Diffuser inlet section 402 includes inlet inner surface 416. Actuated diffuser hub 408 includes diffuser hub surface 418. Actuated diffuser hub 408 can include translational actuator 420.

Diffuser wall 406, diffuser inlet section 402, and/or diffuser outlet section 404 can have a partially porous internal structure. In the example shown in FIGS. 7A-7B, diffuser wall 406 is at least partially composed of an internal lattice structure 422. In some examples, diffuser inlet section 402 and/or diffuser outlet section 404 can additionally or alternatively be at least partially composed of a similar lattice structure. In some examples, diffuser inlet section 402, diffuser outlet section 404, and/or diffuser wall 406 can include internal voids within their respective structures. These voids can be repeating, non-repeating, evenly or unevenly distributed, and similarly or dissimilarly shaped. Actuated diffuser hub 408 can include a variety of surface features, such as those shown in FIGS. 9A-9C.

Radial diffuser 400 can operate in substantially the same way as radial diffuser 302 (described above in reference to FIGS. 4-5B) in that radial diffuser 400 diffuses a working fluid flow. Actuated diffuser hub 408 is configured to translate along central flow axis C-C, thereby moving closer to or further from diffuser wall 402.

The translational movement of actuated diffuser hub 408 along the central flow axis C-C allows the alteration of the diffusion rate of working fluid through radial diffuser 400 and can adjust the fluid flow rate within an air cycle machine. This axial movement also allows for the alteration of the working fluid's expansion rate and pressure ratio within radial diffuser 400. The change in geometry of radial diffuser 400 caused by translational movement of actuated diffuser hub 408 allows the shape of radial diffuser 400 to be optimized to different conditions or operating requirements. A smaller path for fluid flow within radial diffuser 400 can be desirable at lower flow rates, while a wider path for fluid flow can be desirable when the flow rate through the air cycle machine is higher. In this way, an actuated diffuser hub can optimize flow rates through an air cycle machine by tailoring the size of the fluid flow path to the developed fluid flow rate. Additionally, if diffused working fluid is fed back into the turbine after exiting the heat exchanger, an adjusted flow rate may be desirable for increased turbine performance and efficiency.

FIGS. 8A-8B are schematic depictions of radial diffuser 500. Radial diffuser 500 includes diffuser inlet section 502, diffuser outlet section 504, diffuser wall 506, and rotatable diffuser hub 508. Diffuser wall 506 includes diffuser wall inner surface 510 which defines fluid flow path F and which includes convex curved section 512 and concave curved section 514. Diffuser inlet section 502 includes inlet inner surface 516. Rotatable diffuser hub 508 includes diffuser hub surface 518. In the example shown in FIG. 8A, rotatable diffuser hub 508 includes bearing system 520. In the example shown in FIG. 8B, rotatable diffuser hub 508 includes control system 522. FIGS. 8A-8B will be discussed concurrently.

Radial diffuser 500 can operate in substantially the same way as radial diffuser 302 (described above in reference to FIGS. 4-5B) in that radial diffuser 500 diffuses a working fluid flow by increasing its static pressure. In some examples, radial diffuser 500 can contain a partially porous internal structure, such as internal voids or internal structures similar to internal lattice structure 422 (described above in reference to FIGS. 7A-7B). Rotatable diffuser hub 508 is configured to rotate about central flow axis C-C. Bearing system 520 allows rotatable diffuser hub 508 to freely rotate in the working fluid flow within radial diffuser 500. A freely rotatable diffuser hub 508 will rotate when it experiences a shear force of the working fluid flow through radial diffuser 500. Control system 522 can be an electrical connection, a pneumatic system, or other suitable control mechanism. A rotatable diffuser hub 508 with a control system 522 can be actively controlled, and can electrically or pneumatically rotate about central flow axis C-C. Because a diffuser hub rotating in the same direction as the working fluid flow can reduce the velocity of the working fluid flow relative to the diffuser hub, the rotational movement of rotatable diffuser hub 508 can allow for an additional decrease in velocity of the working fluid flow through radial diffuser 500.

Figure 9A:
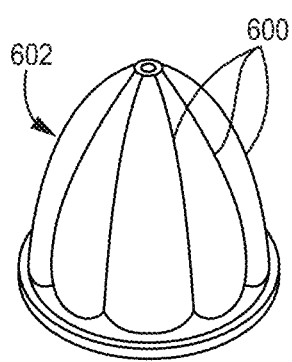
FIGS. 9A-9C depict surface features on a surface of a radial diffuser.
Figure 9B:
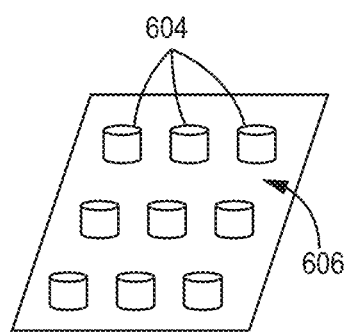
Figure 9C:
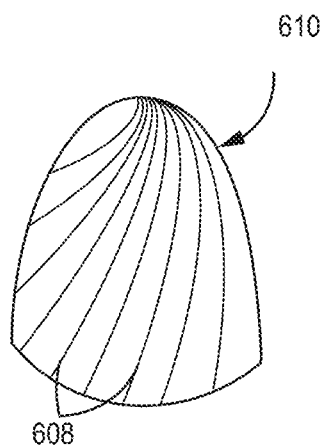

FIGS. 9A-9C depict surface features for use on various surfaces of a radial diffuser, such as radial diffusers 400, 500. FIGS. 9A-9C will be discussed in turn below. FIG. 9A depicts grooves 600 on surface 602. FIG. 9B depicts raised surface features 604 on surface 606. FIG. 9C depicts swirled pattern 608 on surface 610.

As shown in FIG. 9A, grooves 600 are arranged on surface 602. Surface 602 can be a surface of the radial diffuser, such as the diffuser hub surface, diffuser wall inner surface, and/or inlet inner surface. Grooves 600 can be oriented along the fluid flow path and can thereby be aligned with the working fluid flow through the radial diffuser. Alternatively, grooves 600 can be arranged perpendicular to the fluid flow path or otherwise arranged in a pattern which is not aligned with the fluid flow path. Grooves 600 which are not aligned with the anticipated fluid flow path and which are incorporated onto the surface of the diffuser wall or diffuser inlet section can further reduce the velocity of working fluid flow through the radial diffuser. In some examples, grooves 600 can be micro-grooves. Grooves 600 can be incorporated into the surface of the diffuser hub, diffuser wall, and/or diffuser inlet section during additive manufacturing.

As shown in FIG. 9B, raised surface features 604 are arranged on surface 606. Surface 606 can be a surface of the radial diffuser, such as the diffuser hub surface, diffuser wall inner surface, and/or inlet inner surface. In the example shown in FIG. 9B, raised surface features 604 are cylindrical prisms which are approximately uniform in shape and size and which are arranged in a repeating grid pattern on surface 606. In other examples, raised surface features 604 can be varied in shape, size, and/or pattern. In some examples, raised surface features 604 can be micro-features. Raised surface features 604 can vary the surface roughness of the radial diffuser and can help to further decrease the velocity of the working fluid flow through the radial diffuser. Raised surface features 604 can be incorporated into the surface of the diffuser hub, diffuser wall, and/or diffuser inlet section during additive manufacturing.

As shown in FIG. 9C, swirled pattern 608 is arranged on surface 610. Surface 610 can be a surface of the radial diffuser, such as the diffuser hub surface. In the example shown in FIG. 9C, swirled pattern 608 is formed of evenly-spaced grooves which partially encircle surface 610. In other examples, swirled pattern 608 can be formed of unevenly-spaced grooves, or of evenly- or unevenly-spaced raised lines. When combined with a freely rotatable diffuser hub, a swirled pattern 608 which is aligned with an anticipated swirl direction of incoming working fluid flow can further reduce the velocity of the working fluid. Swirled pattern 608 can be incorporated into the surface of the diffuser hub during additive manufacturing.

The surfaces features depicted in FIGS. 9A-9C can be included on the surface of a diffuser hub, such as diffuser hub surfaces 418, 518 of movable diffuser hubs 408, 508. The surface features can additionally and/or alternatively be included on an inner surface of a diffuser inlet section, such as diffuser inlet inner surfaces 416, 516 of diffuser inlet sections 402, 502, and/or an inner surface of a diffuser wall, such as diffuser wall inner surfaces 410, 510 of diffuser walls 406, 506.

Figure 10:
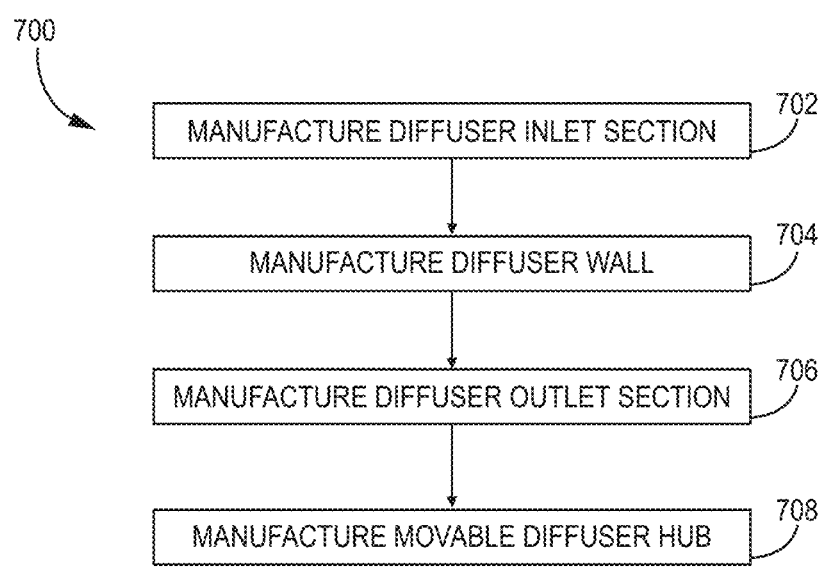
FIG. 10 depicts a method of manufacturing a radial diffuser having a movable diffuser hub.

FIG. 10 depicts method 700 of manufacturing a radial diffuser having a movable diffuser hub, such as radial diffusers 400, 500. Method 700 includes steps 702-708. As described in more detail below, a radial diffuser as described herein can be additively or conventionally manufactured, or can be partially additively manufactured.

In step 702, a diffuser inlet section, such as diffuser inlet sections 402, 502, is manufactured. In some examples, the diffuser inlet section can be additively manufactured. Surface features can be formed on an inner surface of the diffuser inlet section, such as inlet inner surfaces 416, 516. The diffuser inlet section can be manufactured to include a porous internal structure, such as a lattice or series of voids.

In step 704, a diffuser wall, such as diffuser walls 406, 506, is manufactured adjacent to the diffuser inlet section. In some examples, the diffuser wall can be additively manufactured. Surface features can be formed on an inner surface of the diffuser wall, such as diffuser wall inner surfaces 410, 510. The diffuser wall can be manufactured to include a porous structure, such as a lattice or series of voids.

In step 706, a diffuser outlet section, such as diffuser outlet sections 404, 504, is manufactured adjacent to the diffuser wall. In some examples, the diffuser outlet section can be additively manufactured. The diffuser inlet section, diffuser wall, and diffuser outlet section can be additively manufactured as a single monolithic piece. The diffuser outlet section can be manufactured to include a porous structure, such as a lattice or series of voids.

In step 708, a movable diffuser hub, such as movable diffuser hubs 408, 508, is manufactured. In some examples, the movable diffuser hub can be additively manufactured. Surface features can be formed on a surface of the movable diffuser hub, such as diffuser hub surfaces 418, 518. The movable diffuser hub can be manufactured to include a porous structure, such as a lattice or series of voids.

The components of the radial diffuser can be formed of metal, plastic, fiber, a combination of these materials, or other suitable materials. In examples where the radial diffuser is at least partially additively manufactured, the radial diffuser can be partially or entirely manufactured with a heat exchanger, the turbine casing, and/or the movement mechanism as a monolithic structure. Additively manufacturing one or more components of the radial diffuser provides advantages over conventionally manufacturing the radial diffuser by allowing the formation of surface features such as micro-grooves or micro-features, decreasing the number of parts needed by integrating the radial diffuser with the heat exchanger and/or turbine casing, and decreasing the weight of the radial diffuser by incorporating a partially porous internal structure.

A radial diffuser with a movable diffuser hub as described herein provides numerous advantages. A movable diffuser hub can increase the efficiency of the radial diffuser by increasing the diffusion rate, and can control the pressure ratio and expansion rate of the working fluid through axial actuation. A movable diffuser hub can additionally increase the efficiency of other components by altering and/or controlling the mass flow rate. A movable diffuser hub can furthermore help to avoid shock experienced by the working fluid as it flows through the radial diffuser, and allows the radial diffuser's geometry to change in response to the characteristics of the flow of working fluid. These improvements can help to optimize the performance of the radial diffuser and the expansion of the working fluid. Additively manufacturing the movable diffuser hub can allow for material combinations to be implemented, and can additionally allow for the reliable formation of complex and/or fine surface features on various surfaces of the radial diffuser. Additive manufacturing can further allow for a porous structure to be incorporated into parts of the radial diffuser to reduce material use and weight, as well as reducing associated time and materials costs. Additionally, the radial diffuser can be built monolithically with other components, such as a heat exchanger or the movement mechanism of the movable diffuser hub. The manufacturing advantages of additively manufacturing a radial diffuser include reduced cost, reduced number of parts needed, decreased weight, reduced assembly time and complexity, and improved structural performance.

Discussion of Possible Embodiments

The following are non-exclusive descriptions of possible embodiments of the present invention.

A radial diffuser for a heat exchanger system includes a diffuser inlet section, a diffuser outlet section, a diffuser wall, and a movable diffuser hub. The diffuser inlet section is upstream of the heat exchanger system and oriented along a central flow axis of the radial diffuser. The diffuser inlet section has a cylindrical shape which extends along the central flow axis and a circular cross section along an inlet section plane perpendicular to the central flow axis. The diffuser outlet section is downstream of the diffuser inlet section with respect to the central flow axis. The diffuser wall includes a diffuser wall inner surface defining a fluid flow path which is non-linear. The diffuser wall inner surface includes a convex curved section and a concave curved section. The convex curved section is adjacent to the diffuser inlet section and has a convex curvature with respect to the central flow axis. The concave curved section is adjacent to the diffuser outlet section and has a concave curvature with respect to the central flow axis. The concave curved section is adjacent to and downstream of the convex curved section with respect to the central flow axis. The movable diffuser hub is configured to move with respect to the central flow axis relative to the diffuser wall and can thereby alter a fluid flow through the radial diffuser.

The radial diffuser of the preceding paragraph can optionally include, additionally and/or alternatively, any one or more of the following features, configurations, and/or additional components:

A radial diffuser for a heat exchanger system according to an exemplary embodiment of this disclosure, among other possible things includes a diffuser inlet section, a diffuser outlet section, a diffuser wall, and a movable diffuser hub. The diffuser inlet section is upstream of the heat exchanger system and oriented along a central flow axis of the radial diffuser. The diffuser inlet section has a cylindrical shape which extends along the central flow axis and a circular cross section along an inlet section plane perpendicular to the central flow axis. The diffuser outlet section is downstream of the diffuser inlet section with respect to the central flow axis. The diffuser wall includes a diffuser wall inner surface defining a fluid flow path which is non-linear. The diffuser wall inner surface includes a convex curved section and a concave curved section. The convex curved section is adjacent to the diffuser inlet section and has a convex curvature with respect to the central flow axis. The concave curved section is adjacent to the diffuser outlet section and has a concave curvature with respect to the central flow axis. The concave curved section is adjacent to and downstream of the convex curved section with respect to the central flow axis. The movable diffuser hub is configured to move with respect to the central flow axis relative to the diffuser wall and can thereby alter a fluid flow through the radial diffuser.

A further embodiment of the foregoing radial diffuser, further comprising a translational actuator. The translational actuator is configured to control an axial separation between the diffuser hub and the diffuser wall along the central flow axis, thereby altering a diffusion rate of the fluid flow through the radial diffuser.

A further embodiment of any of the foregoing radial diffusers, wherein the movable diffuser hub is configured to rotate about the central flow axis, thereby decreasing a relative velocity of the fluid flow with respect to the movable diffuser hub.

A further embodiment of any of the foregoing radial diffusers, wherein the radial diffuser further comprises a bearing system. The movable diffuser hub is connected to the bearing system, and the movable diffuser hub is configured to rotate about the central axis when a diffuser hub surface of the movable diffuser hub experiences a shear force of the fluid flow.

A further embodiment of any of the foregoing radial diffusers, wherein the radial diffuser further comprises at least one electrical connection and the movable diffuser hub is configured to be electrically rotated about the central flow axis.

A further embodiment of any of the foregoing radial diffusers, wherein the radial diffuser further comprises a pneumatic system and the movable diffuser hub is configured to be pneumatically rotated about the central flow axis.

A further embodiment of any of the foregoing radial diffusers, wherein the movable diffuser hub is additively manufactured and the diffuser hub surface comprises a plurality of surface features.

A further embodiment of any of the foregoing radial diffusers, wherein the plurality of surface features comprises grooves, raised surface features, or a swirled pattern.

A further embodiment of any of the foregoing radial diffusers, wherein the diffuser inlet section, the diffuser wall, and the diffuser outlet section are additively manufactured as a monolithic piece.

A further embodiment of any of the foregoing radial diffusers, wherein at least one of the diffuser inlet section, the diffuser wall, and the diffuser outlet section comprises an internal lattice structure.

A further embodiment of any of the foregoing radial diffusers, wherein at least one of an inlet inner surface of the inlet section and the diffuser wall inner surface comprises a plurality of surface features.

A further embodiment of any of the foregoing radial diffusers, wherein the diffuser outlet section has a rectangular prism shape and a square cross section along an outlet section plane perpendicular to the central flow axis.

An air cycle machine includes a turbine oriented along a central flow axis, a heat exchanger downstream of the turbine with respect to the central flow axis, and a radial diffuser. The turbine includes a turbine outlet. The radial diffuser includes a diffuser inlet section, a diffuser outlet section, a diffuser wall, and a movable diffuser hub. The diffuser inlet section is upstream of the heat exchanger system and oriented along a central flow axis of the radial diffuser. The diffuser inlet section has a cylindrical shape which extends along the central flow axis and a circular cross section along an inlet section plane perpendicular to the central flow axis. The diffuser outlet section is downstream of the diffuser inlet section with respect to the central flow axis. The diffuser wall includes a diffuser wall inner surface defining a fluid flow path which is non-linear. The diffuser wall inner surface includes a convex curved section and a concave curved section. The convex curved section is adjacent to the diffuser inlet section and has a convex curvature with respect to the central flow axis. The concave curved section is adjacent to the diffuser outlet section and has a concave curvature with respect to the central flow axis. The concave curved section is adjacent to and downstream of the convex curved section with respect to the central flow axis. The movable diffuser hub is configured to move with respect to the central flow axis relative to the diffuser wall and can thereby alter a fluid flow through the radial diffuser. The radial diffuser is downstream of the turbine and upstream of the heat exchanger with respect to the central flow axis. The radial diffuser is configured to receive a fluid flow from the turbine through the turbine outlet, diffuse the fluid flow, and direct the fluid flow into the heat exchanger.

The air cycle machine of the preceding paragraph can optionally include, additionally and/or alternatively, any one or more of the following features, configurations, and/or additional components:

An air cycle machine according to an exemplary embodiment of this disclosure, among other possible things includes a turbine oriented along a central flow axis, a heat exchanger downstream of the turbine with respect to the central flow axis, and a radial diffuser. The turbine includes a turbine outlet. The radial diffuser includes a diffuser inlet section, a diffuser outlet section, a diffuser wall, and a movable diffuser hub. The diffuser inlet section is upstream of the heat exchanger system and oriented along a central flow axis of the radial diffuser. The diffuser inlet section has a cylindrical shape which extends along the central flow axis and a circular cross section along an inlet section plane perpendicular to the central flow axis. The diffuser outlet section is downstream of the diffuser inlet section with respect to the central flow axis. The diffuser wall includes a diffuser wall inner surface defining a fluid flow path which is non-linear. The diffuser wall inner surface includes a convex curved section and a concave curved section. The convex curved section is adjacent to the diffuser inlet section and has a convex curvature with respect to the central flow axis. The concave curved section is adjacent to the diffuser outlet section and has a concave curvature with respect to the central flow axis. The concave curved section is adjacent to and downstream of the convex curved section with respect to the central flow axis. The movable diffuser hub is configured to move with respect to the central flow axis relative to the diffuser wall and can thereby alter a fluid flow through the radial diffuser. The radial diffuser is downstream of the turbine and upstream of the heat exchanger with respect to the central flow axis. The radial diffuser is configured to receive a fluid flow from the turbine through the turbine outlet, diffuse the fluid flow, and direct the fluid flow into the heat exchanger.

A method of manufacturing a radial diffuser includes manufacturing a diffuser inlet section of the radial diffuser. A diffuser wall of the radial diffuser is manufactured adjacent to the diffuser inlet section. A diffuser outlet section of the radial diffuser is manufactured adjacent to the diffuser wall. A movable diffuser hub of the radial diffuser is manufactured such that the movable diffuser hub is configured to move relative to the diffuser wall during operation of the radial diffuser.

The method of the preceding paragraph can optionally include, additionally and/or alternatively, any one or more of the following features, configurations, and/or additional components:

A method of manufacturing a radial diffuser according to an exemplary embodiment of this disclosure, among other possible things includes manufacturing a diffuser inlet section of the radial diffuser. A diffuser wall of the radial diffuser is manufactured adjacent to the diffuser inlet section. A diffuser outlet section of the radial diffuser is manufactured adjacent to the diffuser wall. A movable diffuser hub of the radial diffuser is manufactured such that the movable diffuser hub is configured to move relative to the diffuser wall during operation of the radial diffuser.

A further embodiment of the foregoing method, wherein manufacturing the movable diffuser hub comprises additively manufacturing the movable diffuser hub and forming a plurality of surface features on a diffuser hub surface of the movable diffuser hub.

A further embodiment of any of the foregoing methods, wherein manufacturing the diffuser inlet section comprises additively manufacturing the diffuser inlet section. Manufacturing the diffuser wall comprises additively manufacturing the diffuser wall. Manufacturing the diffuser outlet section comprises additively manufacturing the diffuser outlet section. The diffuser inlet section, the diffuser wall, and the diffuser outlet section are additively manufactured as a monolithic piece.

A further embodiment of any of the foregoing methods, further comprising forming a plurality of surface features on at least one of an inlet inner surface of the diffuser inlet section and a diffuser wall inner surface of the diffuser wall.

A further embodiment of any of the foregoing methods, further comprising forming a plurality of surface features on at least one of an inlet inner surface of the diffuser inlet section and a diffuser wall inner surface of the diffuser wall. Manufacturing the movable diffuser hub comprises additively manufacturing the movable diffuser hub and forming a plurality of surface features on a diffuser hub surface of the movable diffuser hub. Manufacturing the diffuser inlet section comprises additively manufacturing the diffuser inlet section. Manufacturing the diffuser wall comprises additively manufacturing the diffuser wall. Manufacturing the diffuser outlet section comprises additively manufacturing the diffuser outlet section. The diffuser inlet section, the diffuser wall, and the diffuser outlet section are additively manufactured as a monolithic piece.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A radial diffuser for a heat exchanger system, the radial diffuser comprising:
  a diffuser inlet section which is upstream of the heat exchanger system and oriented along a central flow axis of the radial diffuser, the diffuser inlet section having a cylindrical shape which extends along the central flow axis and a circular cross section along an inlet section plane perpendicular to the central flow axis;
  a diffuser outlet section which is downstream of the diffuser inlet section with respect to the central flow axis;
  a diffuser wall comprising a diffuser wall inner surface defining a radially outer boundary of a fluid flow path which is non-linear, the diffuser wall inner surface comprising:
    a convex curved section adjacent to the diffuser inlet section and having a convex curvature with respect to the central flow axis; and
    a concave curved section adjacent to the diffuser outlet section and having a concave curvature with respect to the central flow axis, wherein the concave curved section is adjacent to and downstream of the convex curved section with respect to the central flow axis; and
  a movable diffuser hub disposed concentrically with the diffuser wall about the central flow axis and received in the diffuser wall, the moveable diffuser hub having a continuous surface facing the diffuser inlet section and diffuser wall inner surface and defining a radially inner boundary of the fluid flow path;
  wherein the moveable diffuser hub is configured to move axially with respect to the central flow axis relative to the diffuser wall, thereby altering a diffusion rate of a working fluid through the radial diffuser.

2. The radial diffuser of claim 1, further comprising a translational actuator, wherein the translational actuator is configured to move the diffuser hub axially along the central flow axis to control a separation between the diffuser hub and the diffuser, thereby altering a diffusion rate of the fluid flow through the radial diffuser.

3. The radial diffuser of claim 1, wherein the movable diffuser hub is configured to rotate about the central flow axis, thereby decreasing a relative velocity of the fluid flow with respect to the movable diffuser hub.

4. The radial diffuser of claim 3, wherein the radial diffuser further comprises a bearing system, the movable diffuser hub is connected to the bearing system, and the movable diffuser hub is configured to rotate about the central axis when a diffuser hub surface of the movable diffuser hub experiences a shear force of the fluid flow.

5. The radial diffuser of claim 3, wherein the radial diffuser further comprises at least one electrical connection and the movable diffuser hub is configured to be electrically rotated about the central flow axis.

6. The radial diffuser of claim 3, wherein the radial diffuser further comprises a pneumatic system and the movable diffuser hub is configured to be pneumatically rotated about the central flow axis.

7. The radial diffuser of claim 1, wherein the movable diffuser hub is additively manufactured and the diffuser hub surface comprises a plurality of surface features.

8. The radial diffuser of claim 7, wherein the plurality of surface features comprises grooves, raised surface features, or a swirled pattern.

9. The radial diffuser of claim 1, wherein the diffuser inlet section, the diffuser wall, and the diffuser outlet section are additively manufactured as a monolithic piece.

10. The radial diffuser of claim 9, wherein at least one of the diffuser inlet section, the diffuser wall, and the diffuser outlet section comprises an internal lattice structure.

11. The radial diffuser of claim 9, wherein at least one of an inlet inner surface of the inlet section and the diffuser wall inner surface comprises a plurality of surface features.

12. The radial diffuser of claim 1, wherein the diffuser outlet section has a rectangular prism shape and a square cross section along an outlet section plane perpendicular to the central flow axis.

13. An air cycle machine, the air cycle machine comprising:
the radial diffuser of claim 1;
a turbine oriented along the central flow axis, wherein the turbine comprises a turbine outlet; and
a heat exchanger downstream of the turbine with respect to the central flow axis;
wherein the radial diffuser is downstream of the turbine and upstream of the heat exchanger with respect to the central flow axis, and the radial diffuser is configured to:
receive a fluid flow from the turbine through the turbine outlet;
diffuse the fluid flow; and
direct the fluid flow into the heat exchanger.

14. The radial diffuser of claim 1, the continuous surface of the diffuser hub has a concave section having a first radius, the concave section disposed adjacent to the convex curved section of the diffuser wall.

15. The radial diffuser of claim 14, wherein the convex curved section of the diffuser wall has a second radius, the second radius being less than the first radius.

16. A method of manufacturing a radial diffuser, the method comprising:
manufacturing a diffuser inlet section of the radial diffuser configured to be positioned upstream of the heat exchanger system and oriented along a central flow axis of the radial diffuser, the diffuser inlet section having a cylindrical shape which extends along the central flow axis and a circular cross section along an inlet section plane perpendicular to the central flow axis;
manufacturing a diffuser wall of the radial diffuser adjacent to the diffuser inlet section, the diffuser wall comprising a diffuser wall inner surface defining a radially outer boundary of a fluid flow path which is non-linear, the diffuser wall inner surface comprising:
a convex curved section adjacent to the diffuser inlet section and having a convex curvature with respect to the central flow axis; and
a concave curved section adjacent to the diffuser outlet section and having a concave curvature with respect to the central flow axis, wherein the concave curved section is adjacent to and downstream of the convex curved section with respect to the central flow axis;
manufacturing a diffuser outlet section of the radial diffuser adjacent to the diffuser wall and downstream of the diffuser inlet section with respect to the central flow axis; and
manufacturing a movable diffuser hub of the radial diffuser, the moveable diffuser hub disposed concentrically with the diffuser wall about the central flow axis and received in the diffuser wall, the moveable diffuser hub having a continuous surface facing the diffuser inlet section and diffuser wall inner surface and defining a radially inner boundary of the fluid flow path;
wherein the moveable diffuser hub is configured to move axially with respect to the central flow axis relative to the diffuser wall during operation of the radial diffuser to alter a diffusion rate of a working fluid through the radial diffuser.

17. The method of claim 16, wherein manufacturing the movable diffuser hub comprises additively manufacturing the movable diffuser hub and forming a plurality of surface features on a diffuser hub surface of the movable diffuser hub.

18. The method of claim 16, wherein:
manufacturing the diffuser inlet section comprises additively manufacturing the diffuser inlet section;
manufacturing the diffuser wall comprises additively manufacturing the diffuser wall; and
manufacturing the diffuser outlet section comprises additively manufacturing the diffuser outlet section;
wherein the diffuser inlet section, the diffuser wall, and the diffuser outlet section are additively manufactured as a monolithic piece.

19. The method of claim 18, further comprising forming a plurality of surface features on at least one of an inlet inner surface of the diffuser inlet section and a diffuser wall inner surface of the diffuser wall.

20. The method of claim 16, further comprising forming a plurality of surface features on at least one of an inlet inner surface of the diffuser inlet section and a diffuser wall inner surface of the diffuser wall;
wherein:
manufacturing the movable diffuser hub comprises additively manufacturing the movable diffuser hub and forming a plurality of surface features on a diffuser hub surface of the movable diffuser hub;

manufacturing the diffuser inlet section comprises additively manufacturing the diffuser inlet section;

manufacturing the diffuser wall comprises additively manufacturing the diffuser wall;

manufacturing the diffuser outlet section comprises additively manufacturing the diffuser outlet section; and the diffuser inlet section, the diffuser wall, and the diffuser outlet section are additively manufactured as a monolithic piece.

* * * * *